(12) United States Patent
Arimilli et al.

(10) Patent No.: US 6,477,613 B1
(45) Date of Patent: Nov. 5, 2002

(54) CACHE INDEX BASED SYSTEM ADDRESS BUS

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,302

(22) Filed: Jun. 30, 1999

(51) Int. Cl.[7] .............................................. G06F 12/00
(52) U.S. Cl. ........................... 711/3; 711/117; 711/122; 711/137
(58) Field of Search .............................. 711/3, 100, 118, 711/122, 137, 140, 154, 211; 712/207, 237

(56) References Cited

U.S. PATENT DOCUMENTS

| | | | |
|---|---|---|---|
| 4,783,736 A | * 11/1988 | Ziegle et al. ................ 711/130 |
| 5,367,660 A | * 11/1994 | Gat et al. ........................ 711/3 |
| 5,379,396 A | * 1/1995 | Gochman et al. ............ 711/141 |
| 5,644,752 A | * 7/1997 | Cohen et al. ................ 711/122 |
| 5,835,928 A | * 11/1998 | Auslander et al. .............. 711/3 |
| 5,893,146 A | * 4/1999 | Pickett ........................ 711/128 |
| 5,898,849 A | * 4/1999 | Tran ............................ 711/121 |
| 6,101,577 A | * 8/2000 | Tran ............................ 711/125 |
| 6,108,745 A | * 8/2000 | Gupta et al. .................... 711/3 |

* cited by examiner

Primary Examiner—Tuan V. Thai
(74) Attorney, Agent, or Firm—Casimer K. Salys; Bracewell & Patterson, L.L.P.

(57) ABSTRACT

Following a cache miss by an operation, the address for the operation is transmitted on the bus coupling the cache to lower levels of the storage hierarchy. A portion of the address including the index field is transmitted during a first bus cycle, and may be employed to begin directory lookups in lower level storage devices before the address tag is received. The remainder of the address is transmitted during subsequent bus cycles, which should be in time for address tag comparisons with the congruence class elements. To allow multiple directory lookups to be occurring concurrently in a pipelined directory, a portion of multiple addresses for several data access operations, each portion including the index field for the respective address, may be transmitted during the first bus cycle or staged in consecutive bus cycles, with the remainders of each address—including the cache tags—transmitted during the subsequent bus cycles. This allows directory lookups utilizing the index fields to be processed concurrently within a lower level storage device for multiple operations, with the address tags being provided later, but still timely for tag comparisons at the end of the directory lookup. Where the lower level storage device operates at a higher frequency than the bus, overall latency is reduced and directory bandwidth is more efficiently utilized.

27 Claims, 13 Drawing Sheets

CACHE INDEX BASED SYSTEM ADDRESS BUS

BACKGROUND OF THE INVENTION

1. Technical Field

The present invention generally relates to system address transmission and in particular to address buses for transmitting system address to storage devices for data access operations. Still more particularly, the present invention relates to an index based system address bus transmitting data access addresses in a manner optimized for use by storage devices.

2. Description of the Related Art

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, an indexed cache organization is commonly employed. Cache lines, the minimum unit of data which an associated coherency state describes, are stored within the cache in congruence classes. Congruence classes are sets of cache lines for which a portion of the corresponding system addresses—usually a group of higher order bits—are identical. The portion of the system address which identifies the congruence class to which a cache line belongs is the index field. Another field within the system address, the tag, is utilized to distinguish members of a congruence class.

Figure 6A:
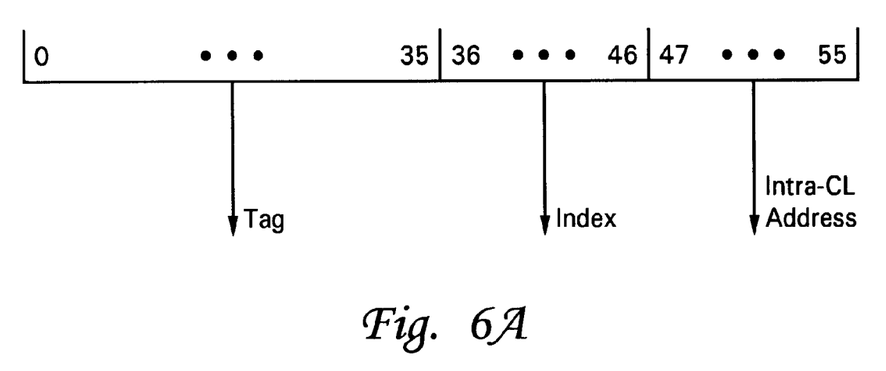
FIGS. 6A–6B is an addressing scheme and corresponding cache organization, respectively, which might be employed in accordance with the known art.
Figure 6B:
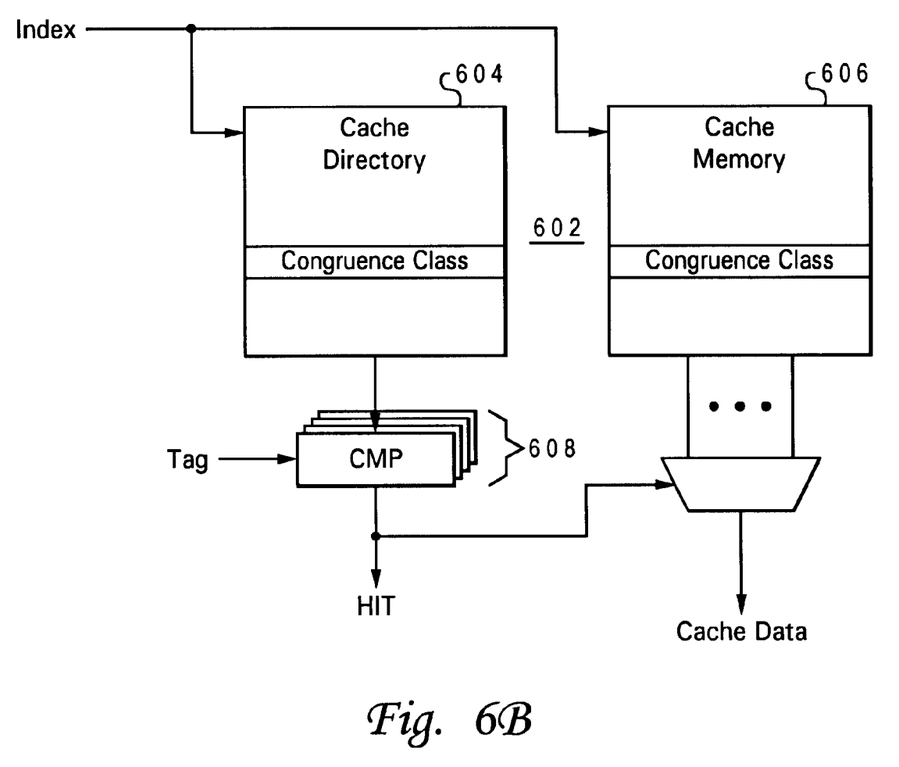

FIGS. 6A and 6B depict an addressing scheme and corresponding cache organization, respectively, which might be employed in accordance with the known art. In the example shown, bits 0 . . . 35 of a 56 bit cache line address are the tag, bits 36 . . . 46 are the index, and the remaining bits are an intra-cache line address. The index field of the address is employed by the cache directory 504 and the cache memory 506 to locate congruence classes. Cache directory 504 stores tags for cache lines contained within cache memory 506 within the congruence class, and compares the tag of a target address to the tags within the congruence class. If a match is identified, the corresponding cache line within cache memory 506 is the target data.

When a cache miss occurs in a higher level cache, the cache line address is transmitted on a bus such as a system bus to lower level caches and/or system memory to retrieve the corresponding cache line. Typically the entire address is transmitted in a single bus cycle if enough address lines are available in the bus. If not, the address is transmitted over multiple consecutive bus cycles with the lower order bits (i.e., the tag in the example shown) being transmitted first.

In contemporary data processing systems, caches and system memories generally operate at higher frequencies than the buses which couple the caches or system memories to other portions of the storage hierarchy. Usually these storage devices operate at internal frequencies which are some multiple of the bus operating frequency. The storage devices are also generally pipelined, allowing several accesses to be handled concurrently. Multiple accesses may be received by the storage device during a single bus cycle and staged to access the cache in a pipeline fashion.

Within the storage devices, the cache directory and memory lookup utilizing the index field is the first and greatest source of latency. Identifying and selecting the appropriate congruence class based on the index, and transmitting the tags and data from that congruence class, may take several internal clock cycles to complete. Once the tags from the directory are sent to the comparators, comparison with the address tag to determine a cache hit or miss should take only one clock cycle. The address tag is therefore not required until the end of the directory lookup.

In conventional designs, however, the address tag is transmitted on the system bus together with the associated index, or even before the associated index. This merely contributes to delay, and is not optimized for the manner in which the address is utilized. It would be desirable, therefore, to provide a system address bus for transmitting address for operations in a manner consistent with usage of the address in performing data access operations in a storage device.

SUMMARY OF THE INVENTION

It is therefore one object of the present invention to provide improved system address transmission.

It is another object of the present invention to provide an improved address buses for transmitting system address to storage devices for data access operations.

It is yet another object of the present invention to provide an index based system address bus transmitting data access addresses in a manner optimized for use by storage devices.

The foregoing objects are achieved as is now described. Following a cache miss by an operation, the address for the operation is transmitted on the bus coupling the cache to lower levels of the storage hierarchy. A portion of the address including the index field is transmitted during a first bus cycle, and may be employed to begin directory lookups in lower level storage devices before the address tag is received. The remainder of the address is transmitted during subsequent bus cycles, which should be in time for address tag comparisons with the congruence class elements. To allow multiple directory lookups to be occurring concurrently in a pipelined directory, a portion of multiple addresses for several data access operations, each portion including the index field for the respective address, may be transmitted during the first bus cycle or staged in consecutive bus cycles, with the remainders of each address—including the cache tags—transmitted during the subsequent bus cycles. This allows directory lookups utilizing the index fields to be processed concurrently within a lower level storage device for multiple operations, with the address tags being provided later, but still timely for tag comparisons at the end of the directory lookup. Where the lower level storage device operates at a higher frequency than the bus, overall latency is reduced and directory bandwidth is more efficiently utilized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
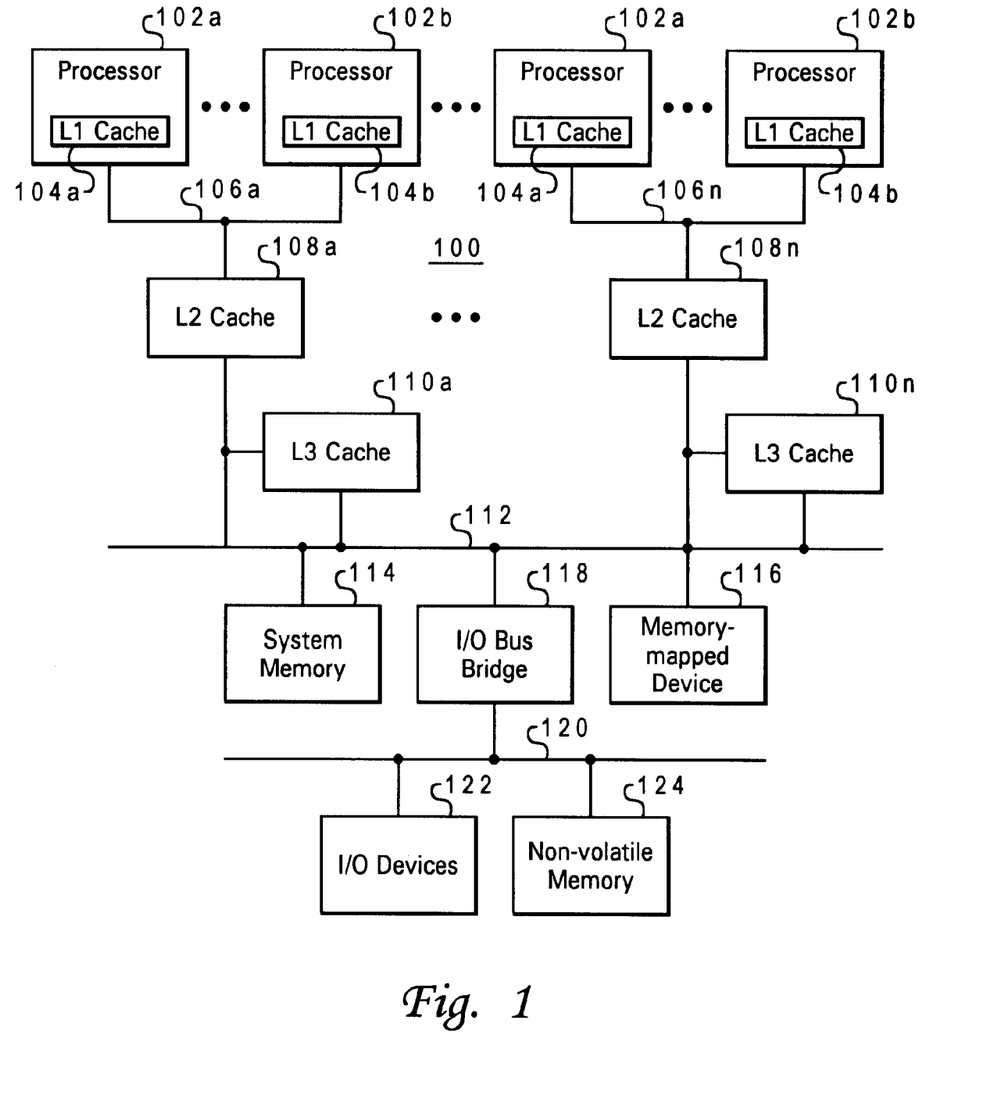
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102a through 102n. Each processor 102a–102n includes a respective level one (L1) cache 104a–104n, preferably on chip with the processor and bifurcated into separate instruction and data caches. Each processor 102a–102n is coupled via a processor bus 106a–106n to a level two cache 108a–108n, which are inline caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108n is connected to a level three (L3) cache 100a–110n and to system bus 112. L3 caches 110a–110n are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108n and L3 caches 110a–110n—are employed to stage data to the L1 caches 104a–104n and typically have progressively larger storage capacities but longer access latencies. L2 caches 108a–108n and L3 caches 110a–110n thus serve as intermediate storage between processors 102a–102n and system memory 114, which typically has a much larger storage capacity but may have an access latency many times that of L3 caches 110a–110n. Both the number of levels in the cache hierarchy and the cache hierarchy configuration (i.e, shared versus private, in-line versus lookaside) employed in data processing system 100 may vary.

L2 caches 108a–108n and L3 caches 110a–110n are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Referring to FIGS. 2A through 2E, timing diagrams for index based address transmission in accordance with a preferred embodiment of the present invention are illustrated. The address transmission timing shown is employed on the system bus 112 of a multiprocessor system 100 following a cache miss at an L2 caches 108a–108n. However, the address transmission scheme may be utilized on any bus when transmitting an address for a data access operation in a storage device.

In the present invention, the address for a data access operation is logically divided into a plurality of segments, each having a size greater than or equal to the number of bits utilized for the index field within the address, and preferably equal to the number of address signal lines in the bus 112 divided by an integer n. Segments or portions of the address are then transmitted on the address bus, each during a different cycle within a consecutive sequence of cycles starting with the segment including the index field. Thus the index field for a data access operation reaches the storage devices first, allowing the directory (and memory) lookup of the congruence class to be initiated before the address tag is transmitted.

Figure 2A:
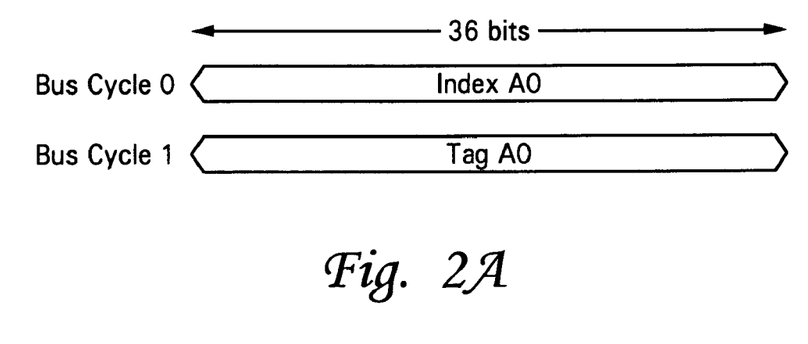
FIGS. 2A–2E are timing diagrams for index based address transmission in accordance with a preferred embodiment of the present invention.

FIG. 2A depicts the simplest embodiment of index based address transmission, in which a 56 bit address of the type previously described is logically divided into two segments and each segment is transmitted, over two bus cycles, on an address bus having 36 conductors. Unlike the prior art, the portion of the address including the index field (bits 36 . . . 55) is transmitted first, during a first bus cycle or staged across consecutive bus cycles including the first bus cycle. The tag (bits 0 . . . 35) is then transmitted on the next bus cycle or cycles following transmission of the index field.

Figure 2B:
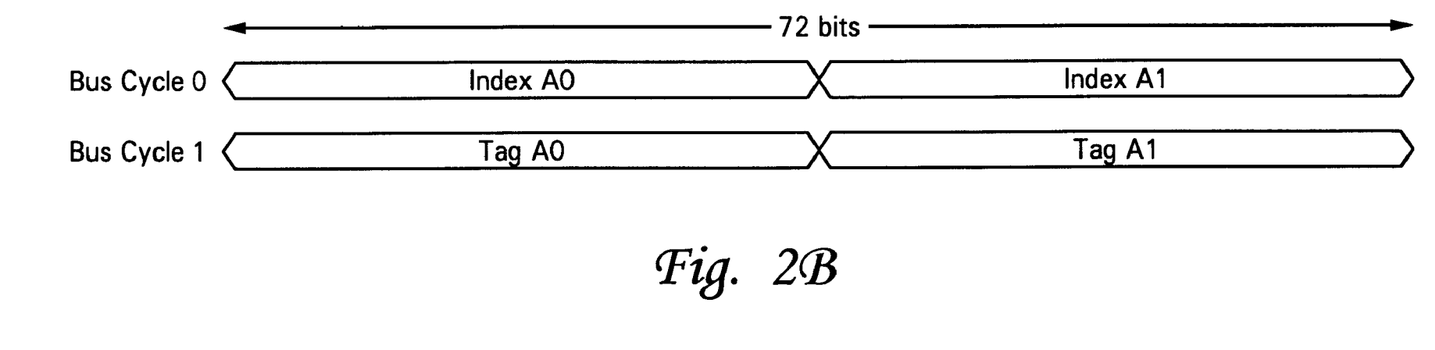

FIG. 2B shows an alternative embodiment for transmission of an address on a 56 bit bus. If two data access operations are available, instead of transmitting the address for only one operation during each bus cycle, the address is again logically divided into 2 portions (bits 0 . . . 35 and 36 . . . 55). The portions for each address containing the respective index fields (bits 36 . . . 55) are both transmitted during the first bus cycle, and the tags for both addresses (bits 0 . . . 35) are transmitted during the next bus cycle.

Thus, both data access operations may be initiated within the storage device(s) coupled to the address bus before the tags arrive, but the tags should arrive in time for comparison with the congruence class elements.

It should be noted that cache misses frequently occur in groups, so that a span of processor cycles during which no cache misses occur may be interrupted by a number of consecutive data accesses all resulting in cache misses. In that event, the address transmission scheme shown is a more efficient utilization of the system bus and of directory bandwidth.

Figure 2C:
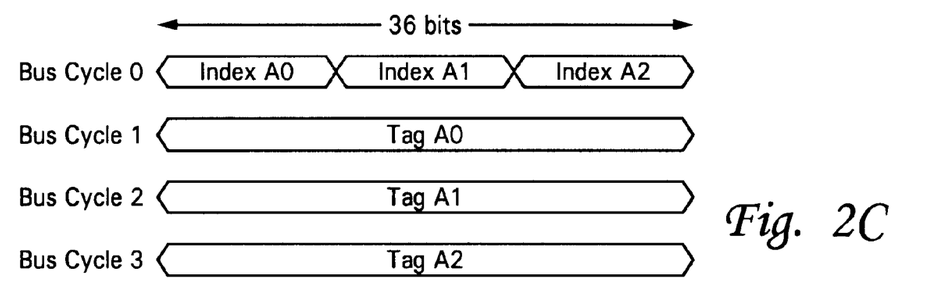

FIG. 2C shows an adaptation of the multiple address transmission scheme for a 36 bit address bus. Since the index field within the addressing scheme being utilized as an example is only 12 bits, and since the remainder of the high order bits (bits 47 . . . 55) are not needed for data access operations in the cache or system memory (which operate only on cache lines, not on specific words within a cache line), only the index field (bits 36 . . . 46) of the upper half of the address needs to be transmitted. If multiple data access operations are available for initiation, the index fields for those operations may be combined in the first bus cycle and the address tags transmitted during subsequent bus cycles.

Although three index fields are shown as being transmitted during the first bus cycle in FIG. 2C, and the corresponding tags during the next three bus cycles, where only two data access operations are available, only the two index fields need be transmitted during the first bus cycle (with the remaining bit set to a null index value) and the corresponding tags transmitted during the next two bus cycles. Similarly, if only one data access operation is available at the time the bus cycle starts, the index for that one operation may be transmitted during the first bus cycle and the tag during the next bus cycle. Thus, the address transmission scheme may dynamically adapt depending whether one, two, or three data access operations are available when the bus cycle starts.

Figure 2D:
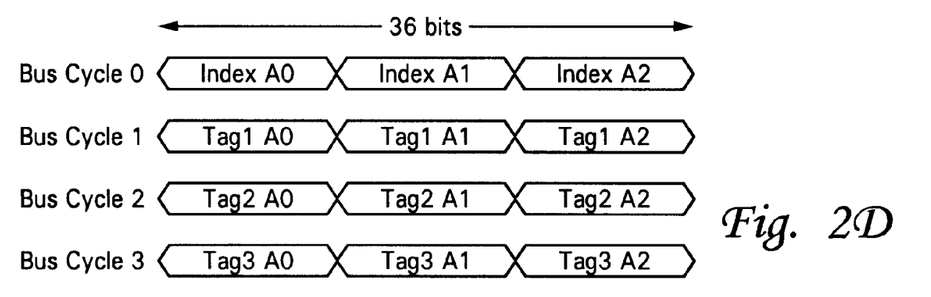

FIG. 2D shows an alternative to the embodiment illustrated by FIG. 2C. In this embodiment, the cache directory comparator function is presumed to be pipelined, with partial tag compares being performed at each stage. Therefore, the address portions to be transmitted (index field and tag) are logically divided into segments each having a size equal to the number of bits defining a congruence class (the size of the index field). The index fields are transmitted during the first bus cycle, as in FIG. 2C. However the address tags, rather than being transmitted as a whole, are transmitted during subsequent bus cycles in portions. In the example of FIG. 2D, a first portion "Tag1" of each address tag (e.g., bits 0 . . . 11) is transmitted during the second bus cycle, a second portion "Tag2" (e.g., bits 12 . . . 23) during the third bus cycle, and a last portion "Tag3" (e.g., bits 24 . . . 35) during the fourth bus cycle. These tag portions may be provided to the pipelined comparators within the receiving storage device(s) as they are received.

Figure 2E:
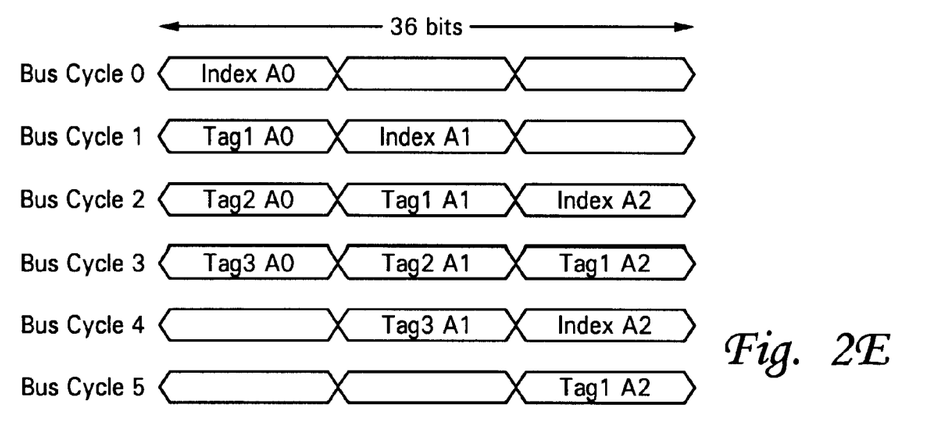

Finally, FIG. 2E shows yet another alternative embodiment in which the index and tag fields, logically divided into segments having a size equal to that of the index field as described above, are transmitted on a 36 bit bus in a manner matching the bus size but completing the first started operation first. Thus, the index for address A0, along with the corresponding tag portions "Tag1," "Tag2" and "Tag3" for address A0, all appear on address bits 0 . . . 11 starting on bus cycle 0 and ending on bus cycle 3. Similarly, the index field and corresponding tag portions for address A1 appear on address bits 12 . . . 23 starting on bus cycle 1 and ending on bus cycle 4, while the index field and corresponding tag portions for address A0 appear on address bits 24 . . . 35 starting on bus cycle 2 and ending on bus cycle 5. The advantage to this arrangement is that the address portions are aligned, with tag portions appearing on the same address lines as the corresponding index and each new index on a different group of address lines, in a pipelined fashion which matches the pipelined directory.

Figure 3A:
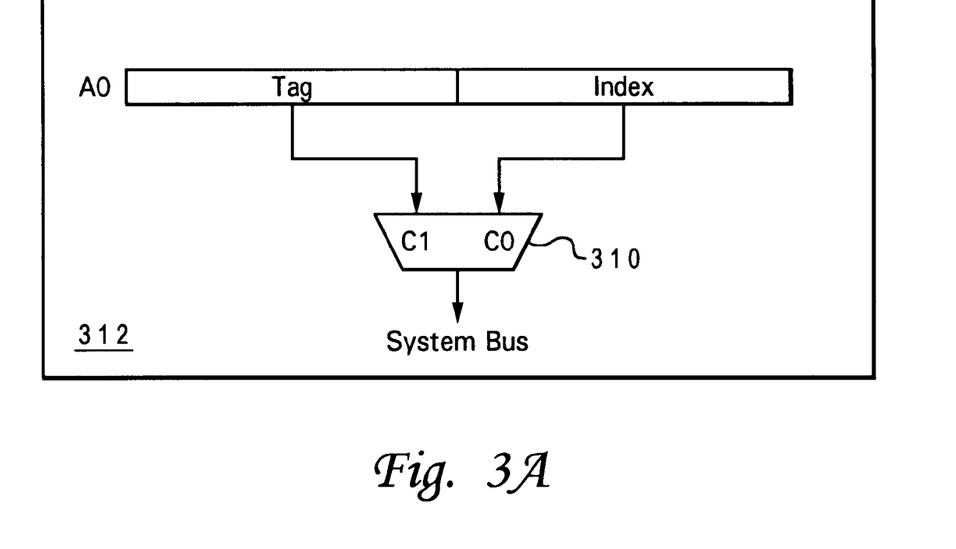
FIGS. 3A–3E depict diagrams of an upper level storage device utilizing index based address transmission in accordance with a preferred embodiment of the present invention.
Figure 3B:
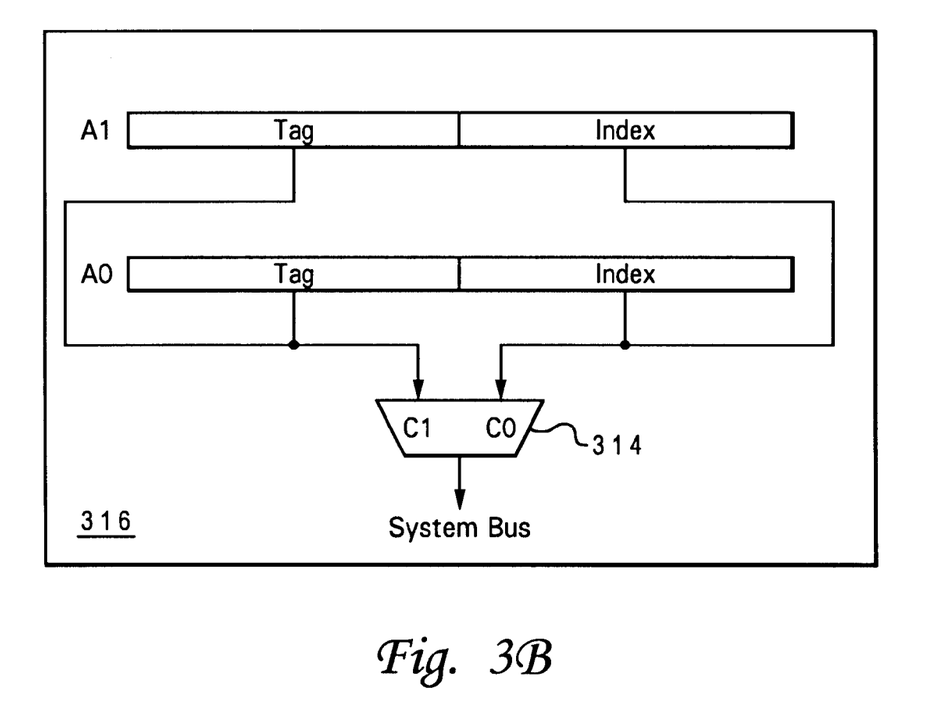
Figure 3C:
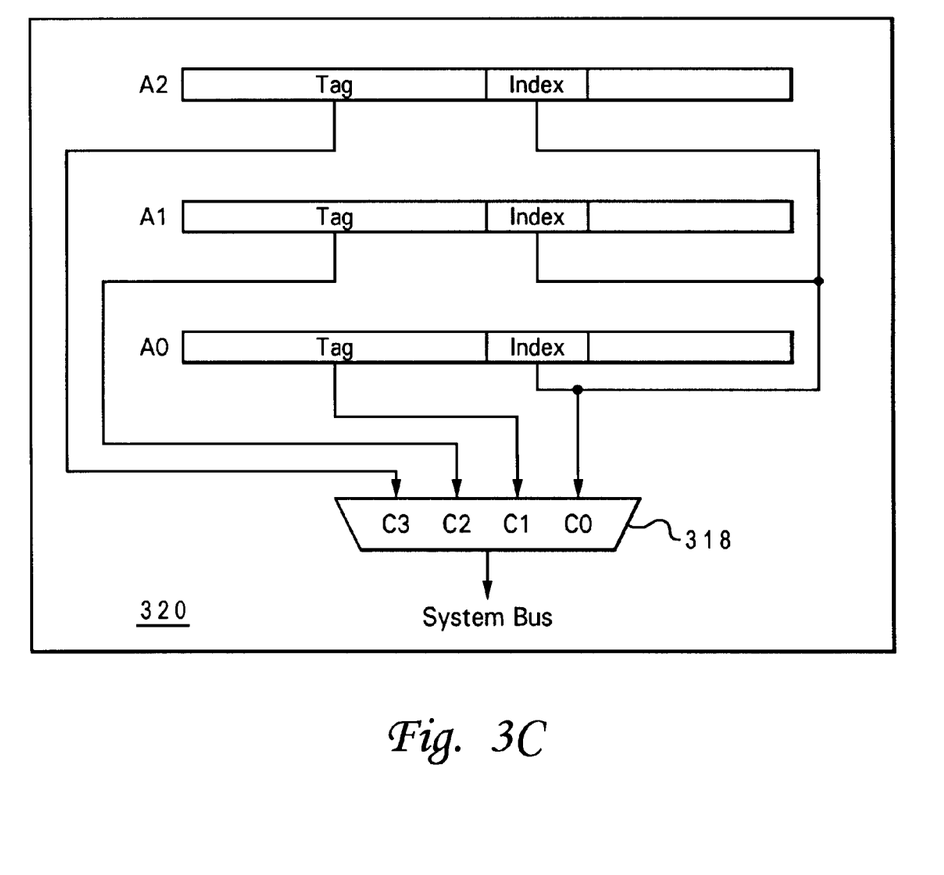
Figure 3D:
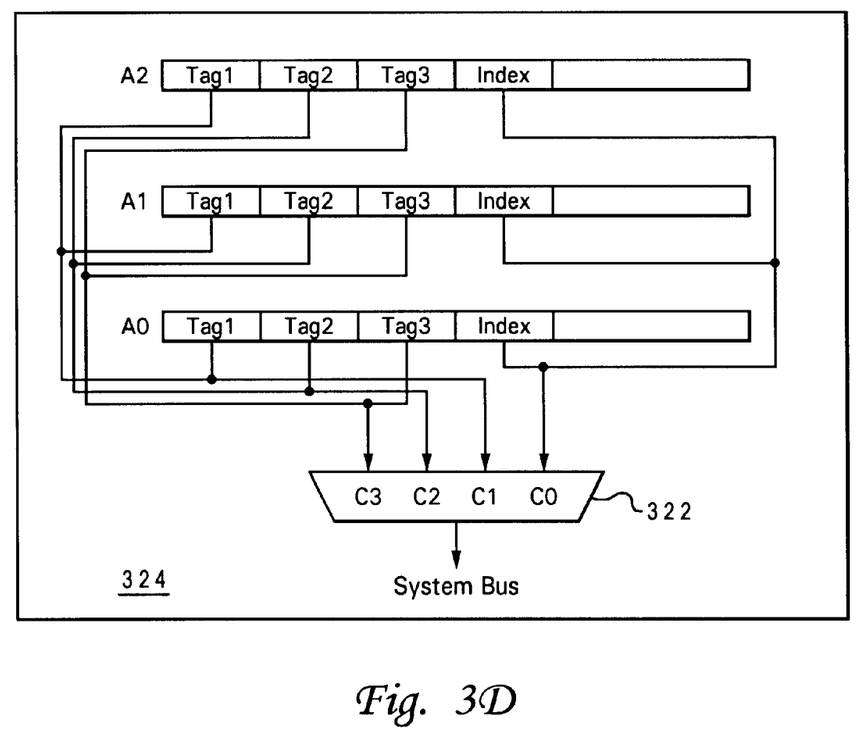
Figure 3E:
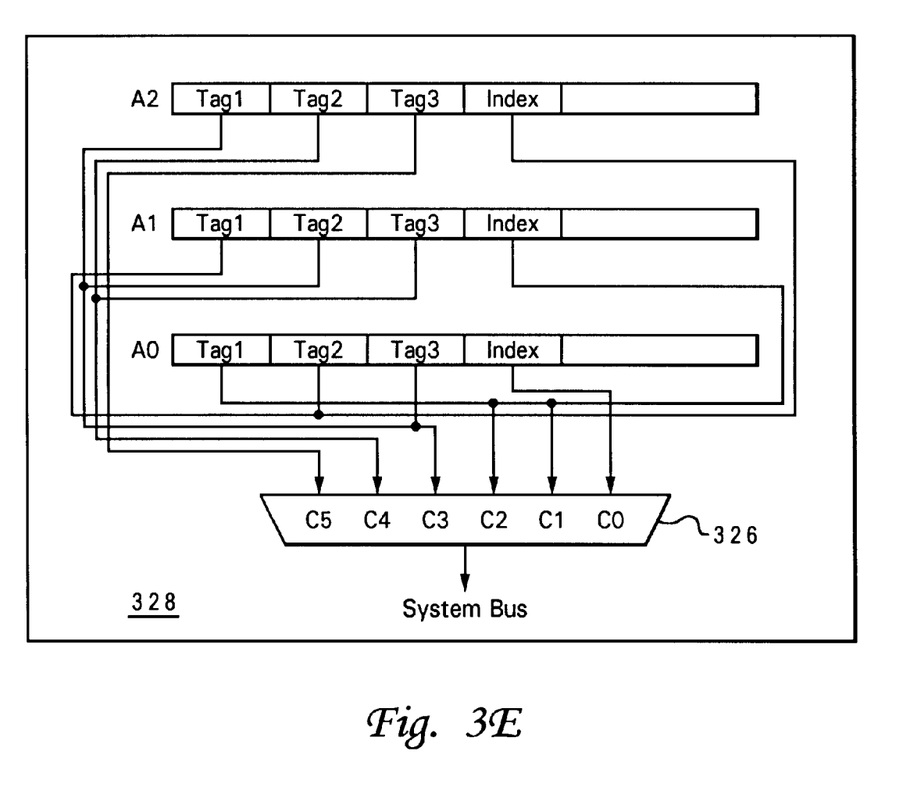
Figure 4A:
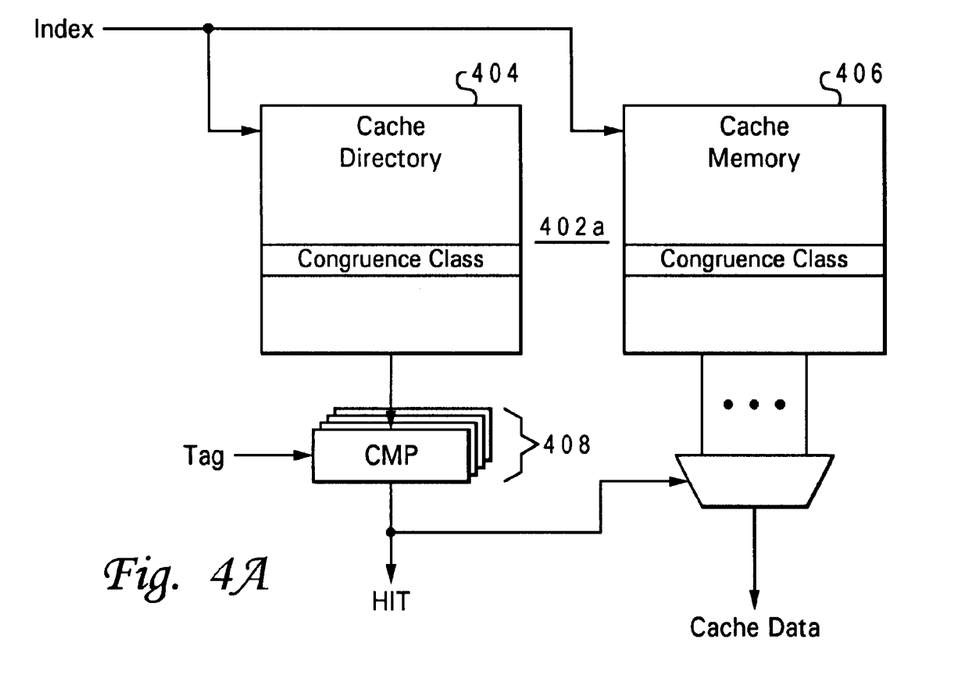
FIGS. 4A–4E are diagrams for a lower level storage device utilizing index based address transmission in accordance with a preferred embodiment of the present invention.
Figure 4B:
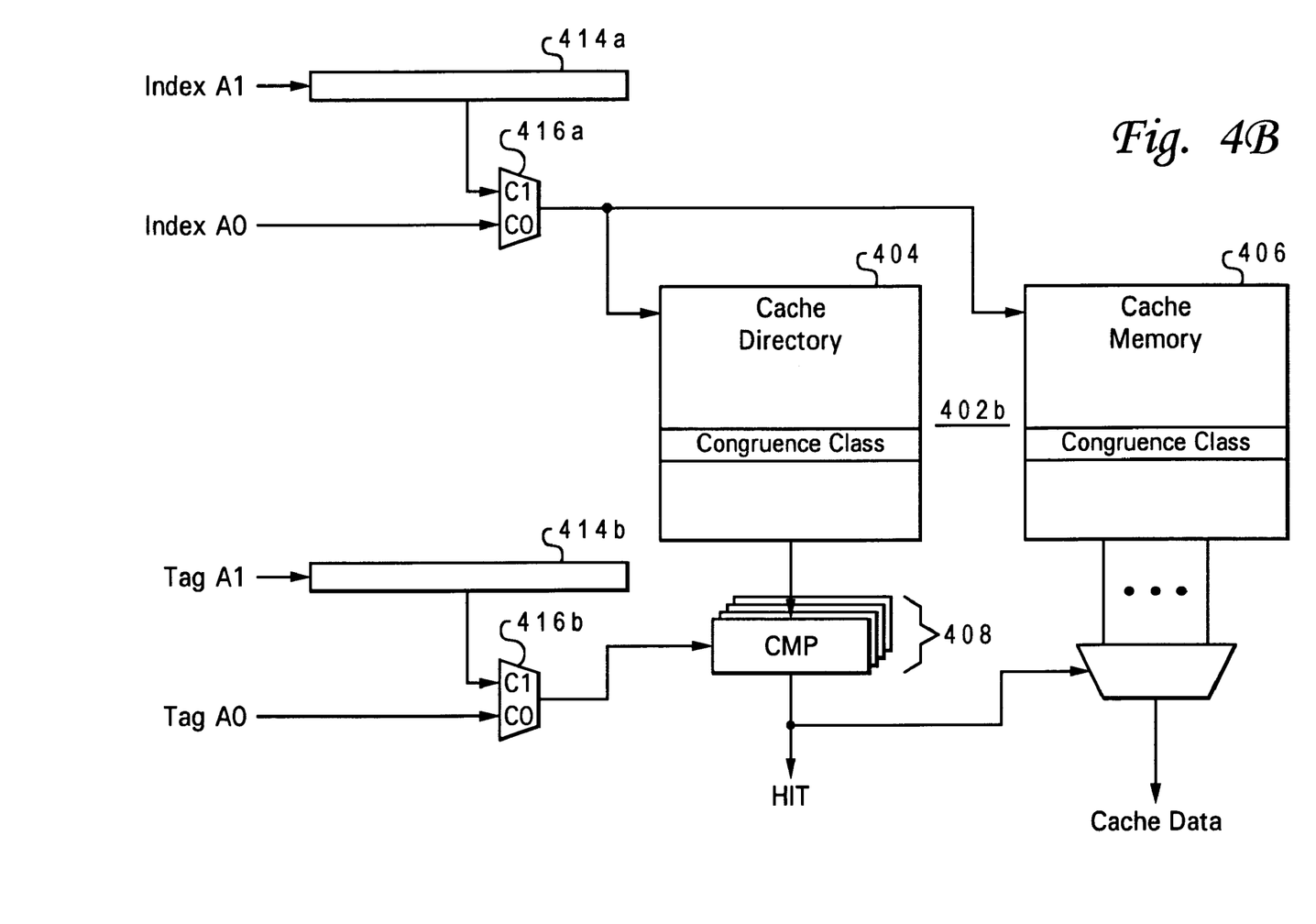
Figure 4C:
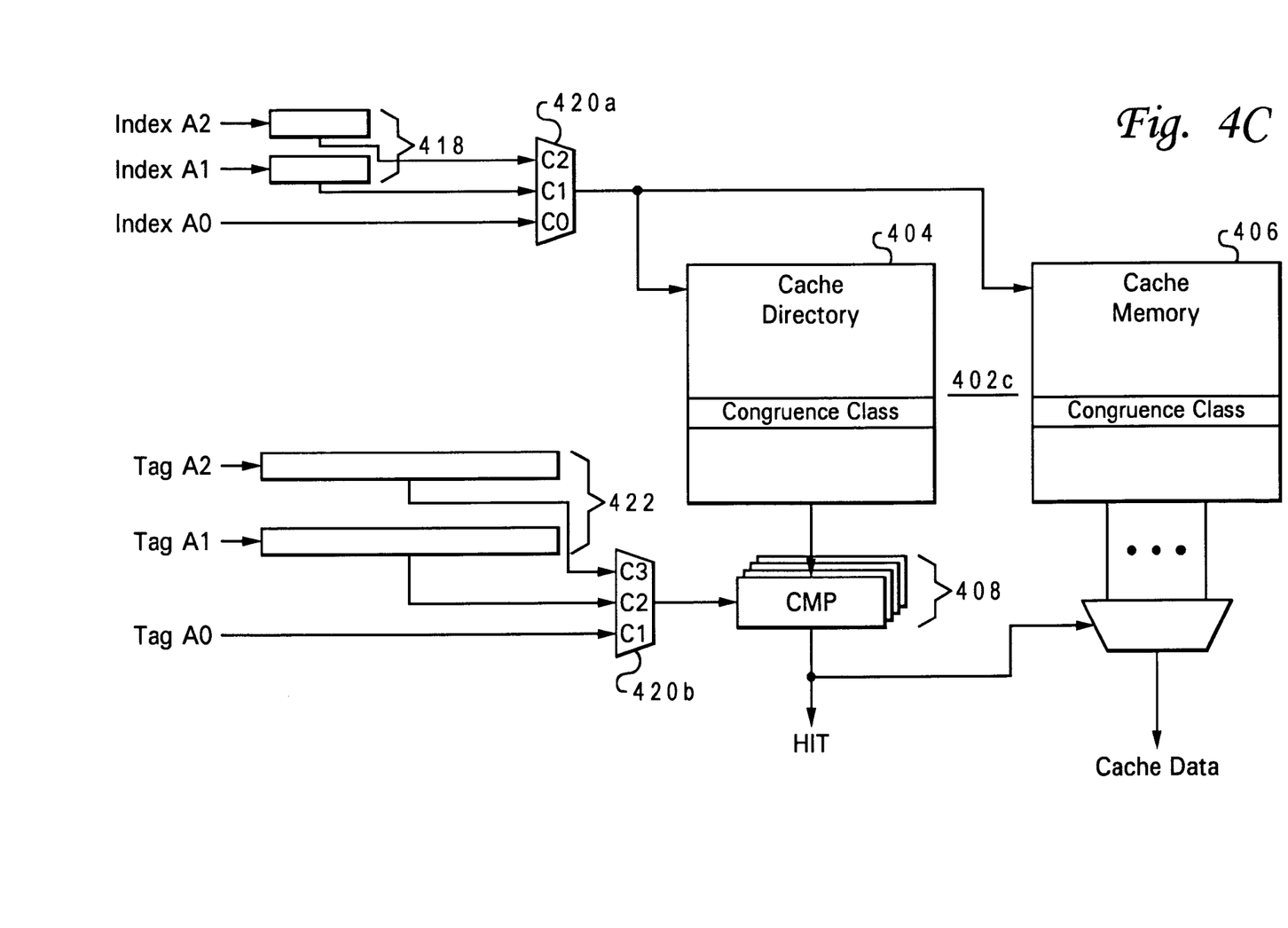
Figure 4D:
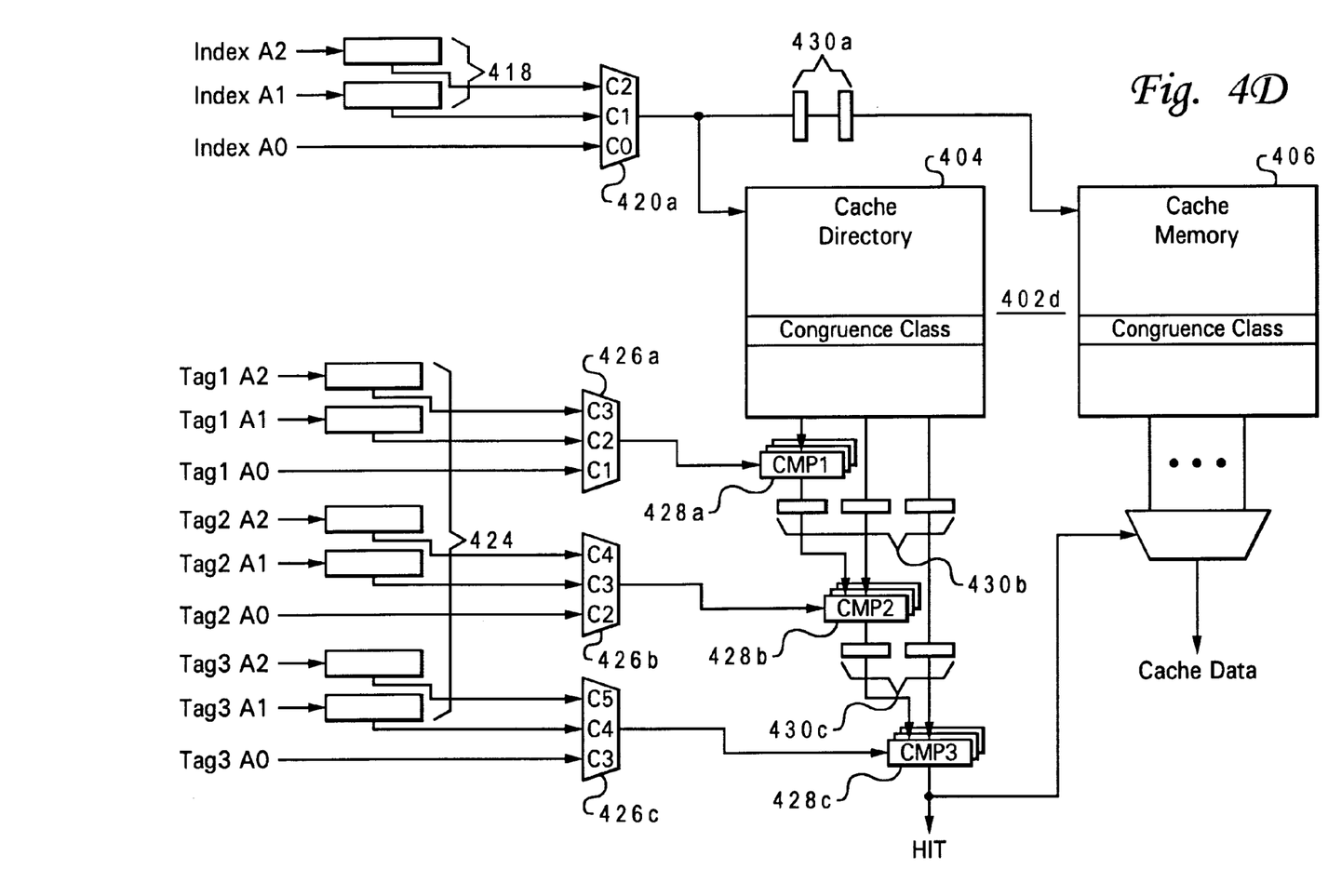
Figure 4E:
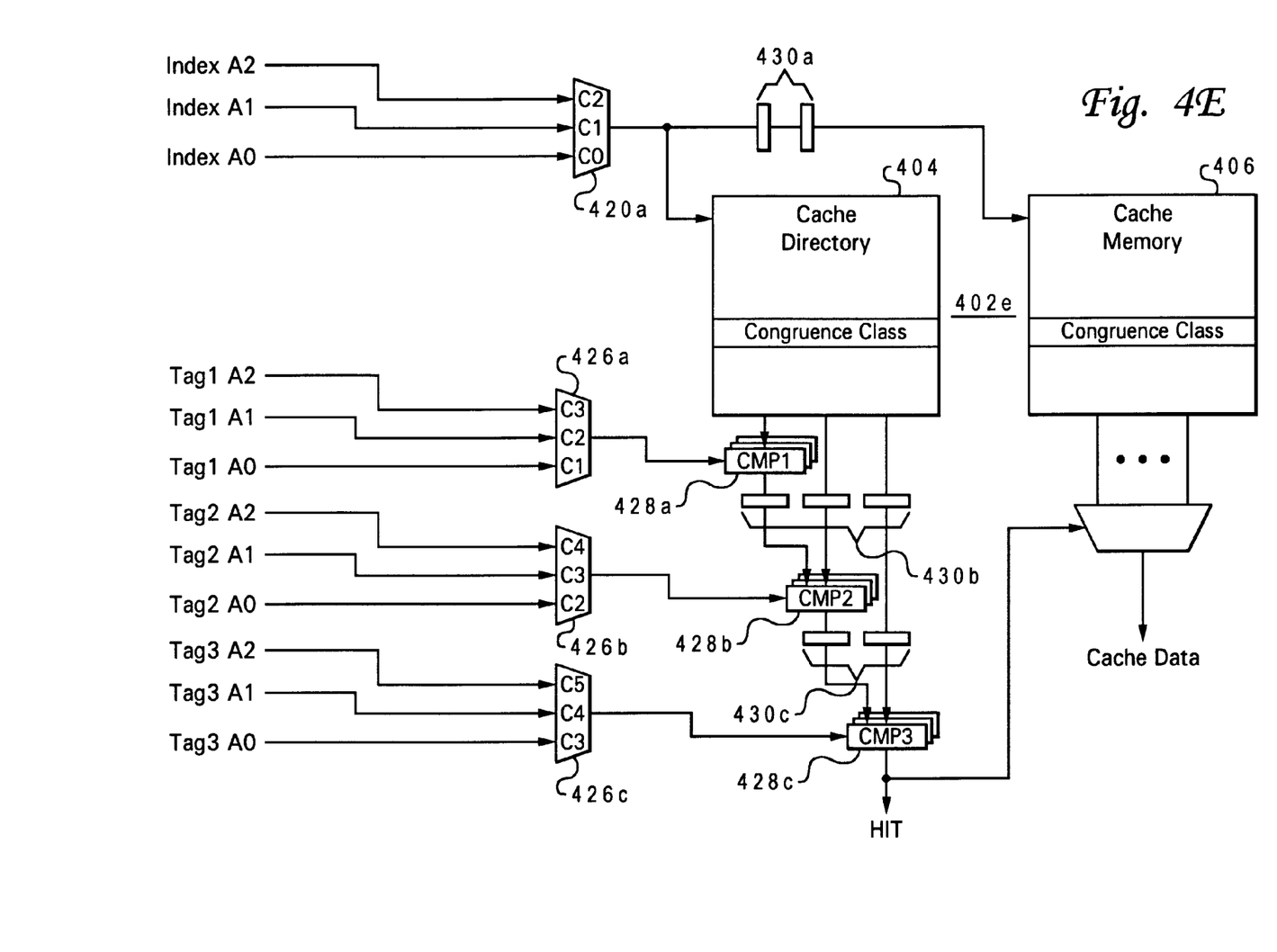

With reference now to FIGS. 3A through 3E and FIGS. 4A through 4E, circuit diagrams for upper and lower level storage devices utilizing index based address transmission in accordance with a preferred embodiment of the present invention are depicted. FIGS. 3A and 4A depict upper and lower level storage devices employing the index based address transmission scheme shown in FIG. 2A; FIGS. 3B and 4B depict upper and lower level storage devices employing the index based address transmission scheme shown in FIG. 2B; FIGS. 3C and 4C depict upper and lower level storage devices employing the index based address transmission scheme shown in FIG. 2C; FIGS. 3D and 4D depict upper and lower level storage devices employing the index based address transmission scheme shown in FIG. 2D; and FIGS. 3E and 4E depict upper and lower level storage devices employing the index based address transmission scheme shown in FIG. 2E. For simplicity, the upper and lower level storage devices are presumed to both operate at the same frequency as the system bus in the examples shown.

FIG. 3A depicts a circuit diagram for an upper level storage device (e.g., L2 cache) utilizing the address transmission scheme of FIG. 2A. Transmission of the address A0 to a lower level storage device (e.g., L3 cache) on the system bus is performed in segments, with a multiplexer 302 within the bus interface unit (BIU) 304 for the higher level storage device selecting the index portion for transmission on the first bus cycle C0 and the tag portion for transmission on the second bus cycle C1.

FIG. 4A depicts a circuit diagram for a lower level storage device (e.g., L3 cache) utilizing the address transmission scheme of FIG. 2A. The lower level storage devices receives index-based address formulated and trasnmitted as described above in connection with FIG. 3A. The lower level storage device 402a routes the received address portions as they are received, utilizing a bus interface unit or other internal data distribution control mechanism. The index portion is sent to the cache directory 404 and cache memory 406 lookup functions during clock cycle C0, and the tag portion is sent to comparators 408 during clock cycle C1.

FIG. 3B depicts a circuit diagram for an upper level storage device utilizing the address transmission scheme of FIG. 2A. The index portions of addresses A0 and A1 are combined and selected by multiplexer 306 within bus interface unit 308 for transmission on the first bus cycle C0; similarly the tag portions for addresses A0 and A1 are combined and selected for transmission on the second bus cycle C1.

FIG. 4B depicts a circuit diagram for a lower level storage device utilizing the address transmission scheme of FIG. 2B, receiving index-based addresses formulated and trasnmitted as described above in connection with FIG. 3B. The lower level storage device 402b routes the index portion of address A0 directly to the cache directory 404 and cache memory 406 during cycle C0, while buffering the index portion of address A1 in buffer 410a and routing that index portion to cache directory 404 and 406 during clock cycle C1. Similarly, the tag portion of address A0 is sent directly to comparators 408 during clock cycle C1, while the tag portion of address A1 is buffered in buffer 410*b* and sent to comparators 408 during clock cycle C2. The index and tags for addresses A0 and A1 are multiplexed utilizing multiplexers 412*a*–412*b*.

It should be noted that the clock cycle identifiers (e.g., "C0" and "C1") within multiplexer(s) 412*a*–412*b* refer to internal clock cycles for the lower level storage device 402*b*, which do not necessarily correspond to the bus cycles employed as identifiers in multiplexer 306 since the upper and lower storage devices may operate at several times the bus clock frequency. As previously noted, however, the upper and lower level storage devices are presumed, for simplicity, to operate at the same clock frequency as the system bus for the purposes of the exemplary embodiment.

FIG. 3C depicts a circuit diagram for an upper level storage device utilizing the address transmission scheme of FIG. 2C. The index fields only of addresses A0, A1 and A2 are combined and selected by multiplexer 310 within bus interface unit 312 for transmission on the first bus cycle C0; the tag portion for address A0 is selected for transmission on the second bus cycle C1; the tag portion for address A1 is selected for transmission on the second bus cycle C2; and the tag portion for address A2 is selected for transmission on the second bus cycle C3.

FIG. 4C depicts a circuit diagram for a lower level storage device utilizing the address transmission scheme of FIG. 2C, receiving index-based addresses formulated and trasnmitted as described above in connection with FIG. 3C. The lower level storage device 402*c* then routes the index portion of address A0 directly to the cache directory 404 and cache memory 406 during clock cycle C0, while buffering the index portions of addresses A1 and A2 in buffers 414, multiplexing these indexes with multiplexer 416*a* and sending them to cache directory 404 and cache memory 406 during clock cycles C1 and C2, respectively. Similarly, in the example shown, the tag portion of address A0 is sent directly to comparators 408 during clock cycle C1, while the tag portions of addresses A1 and A2 are buffered in buffers 418, multiplexed to comparators 408 by multiplexer 316*b* during clock cycles C2 and C3.

Depending on the speed of the directory lookup and compare functions, however, buffering of the tag portions for addresses A1 and A2 as shown (buffers 418) may not be necessary. If storage device 402*c* can complete a directory lookup and compare in two bus cycles (which may correspond to 2, 4 or more internal clock cycles for storage device 402*c*) in a pipelined manner (performing two or more directory lookups or compares concurrently), then the tags for addresses A1 and A2 may be received by storage device 402*c* in a timely manner and may be simply multiplexed by the bus interface unit.

FIG. 3D depicts a circuit diagram of an upper level storage device utilizing the address transmission scheme of FIG. 2D. The index fields only of addresses A0, A1 and A2 are combined and selected by multiplexer 314 within bus interface unit 316 for transmission on the first bus cycle C0; a first tag portion "Tag1" of addresses A0, A1 and A2 are similarly combined and selected by multiplexer 314 for transmission on the second bus cycle C1; a second tag portion "Tag2" of addresses A0, A1 and A2 are next combined and selected by multiplexer 314 for transmission on the third bus cycle C2; and the final tag portion "Tag3" of addresses A0, A1 and A2 are then combined and selected by multiplexer 314 for transmission on the fourth bus cycle C3. The tag portions "Tag1," "Tag2," and "Tag3" of the tags for addresses A0, A1 and A2 each have a size equal to the size of the index field (e.g., 12 bits).

FIG. 4D depicts a circuit diagram for a lower level storage device utilizing the address transmission scheme of FIG. 2D, receiving index-based addresses formulated and trasnmitted as described above in connection with FIG. 3D. The comparators 420*a*–420*c* within lower level storage device 402*d* are presumed to be pipelined for a series of partial tag comparisons in which tag portions "Tag1," "Tag2" and "Tag3" are compared to corresponding portions of tags from the indexed congruence class within cache directory 404 in different stages. Accordingly, the bus interface unit for the lower level storage device 402*d* routes the index portion of address A0 directly to the cache directory 304 during clock cycle C0 but buffers the index portions of addresses A1 and A2 in buffers 414, multiplexing the index portions of these addresses utilizing multiplexer 416*a* for transmission to cache directory 404 and cache memory 406 during clock cycles C1 and C2.

Cache memory 406 receives a pipelined version of the address being presented to cache directory 404 via buffers 422*a*, so that the address received by cache memory 406 is aligned with the clock cycle during which the hit signal is output by comparator 420*c* for the corresponding tag comparisons. Where storage device 402*d* operates at a higher frequency than the system bus, buffers 422*b* and 422*c* may also align the tag comparison signals to the appropriate system bus clock.

Tag portions "Tag1," "Tag2" and "Tag3" of address A2 may also be sent directly to comparators 420*a*–420*c* during clock cycles C1, C2, and C3, respectively. However, the tag portions "Tag1," "Tag2" and "Tag3" of addresses A1 and A2 are buffered in separate buffers 424*a*–424*c* for each corresponding stage of comparators 420*a*–420*c*, multiplexed by multiplexors 426*a*–426*c* and transmitted to comparators 420*a*–420*c* starting with clock cycles C2, C3, and C4 respectively. Buffers 422*b* and 422*c* may also be necessary between comparators 420*a* and 420*b* and between comparators 420*b* and 420*c* for proper signal alignment with system bus clock cycles.

Finally, FIG. 3E depicts a circuit diagram for an upper level storage device utilizing the address transmission scheme of FIG. 2E. The index field only of addresses A0 is selected by multiplexer 318 in bus interface unit 320 for transmission on the first bus cycle C0; a first tag portion "Tag1" of address A0 and the index field portion of address A1 are combined and selected by multiplexer 318 for transmission on the second bus cycle C1; a second tag portion "Tag2" of address A0, a first tag portion "Tag1" of address A1, and the index field portion of address A2 are then combined and selected by multiplexer 318 for transmission on the third bus cycle C2; the final tag portion "Tag3" of address A0, the second tag portion "Tag2" of address A1, and a first tag portion "Tag1" of address A2 are combined and selected by multiplexer 318 for transmission on the fourth bus cycle C3; the final tag portion "Tag3" of address A1 and the second tag portion "Tag1" of address A2 are combined and selected by multiplexer 318 for transmission on the fifth bus cycle C4; and the final tag portion "Tag3" of address A2 is selected by multiplexer 318 for transmission on the sixth bus cycle C5. Again, the tag portions "Tag1," "Tag2," and "Tag3" of the tags for addresses A0, A1 and A2 each preferably have a size equal to the size of the index field (e.g., 12 bits).

FIG. 4E depicts a circuit diagram for a lower level storage device utilizing the address transmission scheme of FIG. 2E, receiving index-based addresses formulated and trasnmitted as described above in connection with FIG. 3E. Comparators 420a–420c are again pipelined for partial tag comparisons. The bus interface unit for the lower level storage device 402e routes the index portion of address A0 directly to the cache directory 404 during clock cycle C0 and also, due to address alignment, directly routes the index portion of addresses A1 and A2 during the clock cycle (C1 or C2) in which the respective index arrives to the directory 404 of storage device 402e utilizing multiplexer 416a. Cache memory 406 again receives pipelined version of the address presented to cache directory 404 via buffers 322a for signal alignment. The need for buffers 414 depicted in FIG. 4D, which are expensive in chip area to implement, is eliminated by address alignment on separate address line subsets.

Tag portions "Tag1," "Tag2" and "Tag3" of address A0 may be sent directly to comparators 420a–420c when they are received, during clock cycles C1, C2, and C3, respectively. In addition, due to the alignment of the addresses on separate groups of conductors, the tag portions "Tag1," "Tag2" and "Tag3" of addresses A1 and A2 may also be sent directly to comparators 420a–420c via multiplexors 426b–426d when they arrive. The need for buffers 424a–424c depicted in FIG. 4D is also eliminated. As noted above, however, Ebuffers 422b and 422c may be necessary between pipeline stages of the comparators for signal alignment.

Figure 5:
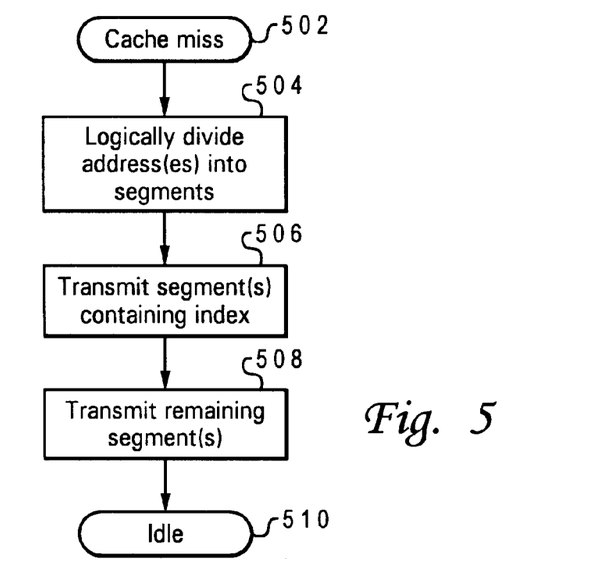
FIG. 5 depicts a high level flow chart for a process of employing index based address transmission in accordance with a preferred embodiment of the present invention.

Referring to FIG. 5, a high level flow chart for a process of employing index based address transmission in accordance with a preferred embodiment of the present invention is illustrated. The process begins at step 502, which illustrates a cache miss occurring. It should be noted, however, that cache misses result for data access operations by an associated processor, and that the process may be initiated directly by a data access operation from a processor.

The process first passes to step 504, which illustrates logically dividing the address for the target of the data access operation into a plurality of segments, each of which is greater than or equal to the size of the index field for the address. The process next passes to step 506, which depicts transmitting one or more address segments including an index field for an address during a first bus cycle, and then to step 508, which illustrates transmitting the remaining address segments during one or more subsequent bus cycles. The process then passes to step 510, which depicts the process becoming idle until another operation is initiated requiring access of data within a storage device coupled to a bus.

It should be noted that storage devices coupled by a common bus may utilize different bits from the address as the index field. For instance, an L2 cache may utilize 512 byte cache lines indexed using address bits 38 . . . 46 of the system address, while an in-line L3 cache employs 2098 byte cache lines index by bits 36 . . . 44. For such heterogeneous cache combinations, the system bus index field chosen would ideally be the superset of the various index ranges utilized by the different storage devices (i.e., bits 36 . . . 46 for the example given) when logically dividing the address for index-based address transmission in accordance with the present invention.

The present invention reduces latency of data access operations by transmitting the addresses for the operation in a manner consistent with their use: index first. This improves performance of pipelined, high bandwidth directories through more efficient usage of the available directory bandwidth.

Additionally, packaging technology of integrated circuit devices has not kept pace with improvements in the fabrication of such devices. Accordingly, an integrated circuit may utilize a bus having more conductors than there are pins available on the packaging for the integrated circuit device. Where fewer address out pins are available than internal bus conductors, the addresses transmitted on the bus must be transmitted over multiple bus cycles. The present invention provides the most effective means available for transmitting addresses over multiple bus cycles to other system devices.

While the invention has been particularly shown and described with reference to a preferred embodiment, it will be understood by those skilled in the art that various changes in form and detail may be made therein without departing from the spirit and scope of the invention.

What is claimed is:

1. A method of accessing data within a data processing system including a plurality of storage devices coupled to a bus, said method comprising:
   during a first bus cycle, a storage device transmitting, on the bus coupling the plurality of storage devices, portions of a plurality of addresses, wherein the transmitted portion of each of the plurality of addresses includes at least part of an index field for a corresponding address; and
   the storage device transmitting on the bus a remainder of the plurality of addresses during one or more subsequent bus cycles following the first bus cycle.

2. The method of claim 1, wherein the step of transmitting a portion of the plurality of addresses during a first bus cycle further comprises:
   transmitting only the index fields of the plurality of addresses during the first bus cycle.

3. The method of claim 1, wherein the step of transmitting a portion of the plurality of addresses during a first bus cycle further comprises:
   transmitting the index fields over a group of consecutive bus cycles starting with the first bus cycle.

4. The method of claim 1, wherein the step of transmitting a remainder of the plurality of addresses during one or more subsequent bus cycles following the first bus cycle further comprises:
   transmitting an address tag for at least one address during a second bus cycle.

5. The method of claim 1, wherein the step of transmitting a remainder of the plurality of addresses during one or more subsequent bus cycles following the first bus cycle further comprises:
   transmitting a first plurality of address tag portions for the plurality of addresses during a second bus cycle;
   transmitting a second plurality of address tag portions for the plurality of addresses during a third bus cycle; and
   transmitting a third plurality of address tag portions for the plurality of addresses during a fourth bus cycle.

6. The method of claim 1, wherein the step of transmitting a remainder of the plurality of addresses during one or more subsequent bus cycles following the first bus cycle further comprises:
   logically dividing address tags for the plurality of addresses into a plurality of portions; and
   transmitting a portion of each of the address tags during second, third and fourth bus cycles, wherein a portion of each address tag is transmitted during each bus cycle.

7. The method of claim 6, wherein the step of logically dividing address tags for the plurality of addresses into a plurality of portions further comprises:
   dividing the address tags into portions each having a size equal to a size of the index field.

8. The method of claim 1, further comprising:
   transmitting a portion of a second address including an index field for the second address during a second bus cycle following the first bus cycle.

9. The method of claim 8, wherein the step of transmitting a portion of a second address further comprises:

transmitting the portion of a first address among the plurality of addresses on a first set of address lines of the bus and the portion of the second address on a second set of address lines of the bus different than the first set of address lines.

10. The method of claim 1, wherein at least two of the plurality of storage devices employ different address bits as an index and wherein the step of transmitting a portion of the plurality of addresses during a first bus cycle further comprises transmitting, as the index field for each of the plurality of addresses, all bits in the respective address employed as index bits by any storage device coupled to the bus.

11. The method of claim 1, wherein the storage device comprises a first storage device, said method flirter comprising:

responsive to receiving a portion of a first address among said plurality of addresses, a second storage device looking up a congruence class within a directory utilizing an index field contained within the portion of the first address.

12. The method of claim 11, further comprising:

responsive to receiving an address tag for the first address, the second storage device comparing the address tag to address tags within a congruence class within the directory identified by the index field.

13. The method of claim 12, further comprising:

comparing the address tags during a bus cycle following a bus cycle during which the congruence class is looked up in the directory.

14. The method of claim 1, further comprising:

responsive to receiving the plurality of address portions for a plurality of addresses, each address portion containing an index field for a corresponding address, a second storage device buffering at least some of the address portions and initiating pipelined directory lookups utilizing the index fields of each address portion.

15. The method of claim 1, further comprising:

responsive to receiving a plurality of address tags for the plurality of addresses, buffering at least some of the address tags and comparing, in a pipelined manner, each received address tags to address tags within a congruence class identified by the index field for a corresponding address.

16. A method of operating a data processing system including a plurality of storage devices coupled to a bus, said method comprising:

a storage device transmitting during a first bus cycle an index for a first address on a first subset of address lines of the bus coupling the plurality of storage devices;

the storage device transmitting a tag for the first address on the first subset of address lines of the bus during one or more bus cycles following the first bus cycle;

the storage device transmitting an index for a second address on a second subset of address lines of the bus during a second bus cycle immediately following the first bus cycle; and the storage device transmitting a tag for the second address on the second subset of address lines of the bus during one or more bus cycles following the second bus cycle.

17. The method of claim 16, wherein the step of transmitting a tag for the first address on the first subset of address lines during one or more bus cycles following the first bus cycle further comprises:

transmitting portions of the tag during second, third, and fourth bus cycles following the first bus cycle.

18. The method of claim 16, further comprising:

transmitting an index for a third address on a third subset of address lines during a third bus cycle immediately following the second bus cycle; and transmitting a tag for the third address on the third subset of address lines during one or more bus cycles following the third bus cycle.

19. The method of claim 16, further comprising:

initiating a data access operation utilizing the first address when the index for the first address is received; and initiating a data access operation utilizing the second address when the index for the second address is received.

20. The method of claim 19, wherein the step of initiating a data access operation utilizing the first address when the index for the first address is received further comprises:

routing the index for the first address to a directory during a cycle in which the index for the first address is received.

21. The method of claim 20, further comprising:

routing each portion of the tag for the first address to a corresponding comparator during a cycle in which the respective tag portion for the first address is received.

22. A system, comprising:

a bus; and first and second storage devices coupled to the bus, wherein the first storage device:

transmits to the second storage device on the bus portions of a plurality of addresses during a first bus cycle, wherein the transmitted portion of each of the plurality of addresses includes at least part of an index field for a corresponding address; and transmits to the second storage device on the bus a remainder of the plurality of addresses during one or more subsequent bus cycles following the first bus cycle.

23. The system of claim 22, wherein the first storage device transmits the tag for each of the plurality of addresses in portions on consecutive cycles.

24. The system of claim 23, wherein the first storage device transmits the index and corresponding tag portions for each address within the plurality of addresses on different address line subsets.

25. The system of claim 22, wherein said second storage device, responsive to receipt of the address portions from the bus, initiates data access operations in a pipelined fashion.

26. The system of claim 22, further comprising:

a plurality of processors, wherein at least one of the plurality of processors is coupled to the first storage device;

a plurality of lower level storage devices coupled to the system bus, said plurality of lower level storage devices including the first and second storage devices.

27. A storage device for use with a system interconnect coupling storage devices, said storage device comprising:

means for transmitting on the system interconnect a portion of a plurality of addresses during a first clock cycle, wherein the transmitted portion of each of the plurality of addresses includes at least part of an index field for a corresponding address; and means for transmitting on the system interconnect a remainder of the plurality of addresses during one or more subsequent clock cycles following the first clock cycle.

* * * * *